(12) United States Patent
Heuts et al.

(10) Patent No.: US 7,919,540 B2
(45) Date of Patent: Apr. 5, 2011

(54) RIGID, LOW DENSITY FOAM

(75) Inventors: Martin Heuts, North Wales, PA (US); David Goodro Kelly, Ambler, PA (US); David Wayne Wolf, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 522 days.

(21) Appl. No.: 11/999,077

(22) Filed: Dec. 4, 2007

(65) Prior Publication Data

US 2008/0132596 A1 Jun. 5, 2008

Related U.S. Application Data

(60) Provisional application No. 60/872,701, filed on Dec. 4, 2006.

(51) Int. Cl.
*C08J 9/228* (2006.01)
*C08J 9/00* (2006.01)

(52) U.S. Cl. .......... 521/99; 521/182; 521/186; 521/189; 525/185; 525/419; 525/421; 525/471; 525/539

(58) Field of Classification Search .................. 521/98, 521/182; 525/185, 419, 421; 528/302, 392, 528/492

See application file for complete search history.

(56) References Cited

U.S. PATENT DOCUMENTS

| 5,132,367 | A | 7/1992 | Chan |
| 2005/0081994 | A1 | 4/2005 | Beckley et al. |
| 2005/0245721 | A1 | 11/2005 | Beckley et al. |

FOREIGN PATENT DOCUMENTS

| EP | 1 435 383 A | 7/2004 |
| EP | 1 462 501 A | 9/2004 |
| EP | 1 593 727 A | 11/2005 |
| EP | 1 640 388 A | 3/2006 |

*Primary Examiner* — Irina S Zemel
(74) *Attorney, Agent, or Firm* — Andrew E C Merriam

(57) ABSTRACT

A foam comprising the reaction product of one or more multifunctional acrylates with one or more multifunctional aceto- or cyano-acetate compounds in the presence of a base and a blowing agent.

10 Claims, No Drawings

RIGID, LOW DENSITY FOAM

This application claims the benefit of priority under 35 U.S.C. § 119(e) of U.S. Provisional Patent Application No. 60/872,701 filed on Dec. 4, 2006.

This invention is a rigid light weight foam that does not require the use of isocyanates. Isocyanates are a family of highly reactive, low molecular weight chemicals. They are widely used, among other things, in the manufacture of rigid, light weight foams and similar materials. Spray-on foam products containing isocyanates that form rigid, light weight foams have been developed for a wide range of retail, commercial, and industrial uses to protect cement, wood, fiberglass, steel and aluminum, including protective coatings for truck beds, trailers, boats, foundations, walls, roofing and decks.

However, isocyanates are powerful irritants to the mucous membranes of the eyes and gastrointestinal and respiratory tracts. Direct skin contact can cause marked inflammation. Isocyanates can sensitize workers, making them subject to severe asthma attacks if they are exposed again.

Thus, there is a need for rigid foams that can be made without isocyanates. U.S. Patent publication no. 20050081994 reports that certain foams can be made with Carbon-Michael chemistries, although no rigid, light weight foam is disclosed.

This invention is a foam comprising the reaction product of (a) one or more multifunctional acrylate compounds with (b) one or more multifunctional aceto- or cyano-acetate compounds or acetoacetamides, in the presence of a base and a blowing agent wherein the molar ratio of acrylate groups in (a) to the acetoacetate, cyanoacetate, or acetoadetamide groups in (b) is greater than 1.4, wherein the measured Tg of the reaction product is greater than about 50° C., and wherein the foam has a density of less than 80 kilograms per cubic meter, and has a maximum compressive strength greater than 35 kilopascal at or before 10% deflection of the foam.

Preferably, the foam has a rise time of less than 600 seconds to its maximum volume following initiation of the reaction, and shrinks less than 25 volume percent after the maximum volume is achieved.

Preferably, the ratio above is between 1.5 and 2.0; the measured Tg of the reaction product is greater than about 80° C.; and the foam has a density between 25 and 60 kilograms per cubic meter.

"(Co)polymer" means homo- or co-polymer.

"Glass transition temperature" or "Tg" means the midpoint glass transition temperature of a polymer as determined by differential scanning calorimetry (DSC"), in accordance with ASTM E-1356-91 where samples are run on a TA Instruments Q-1000 DSC at a ramp rate of between 100 to 20° C./min., in a nitrogen atmosphere, from −90° C. to 150° C. (twice). The midpoint inflection was taken from the second heating. When we say that a polymer has a Tg of greater than a stated value, we mean that the midpoint of the single inflection point in the DSC curve is above that value. Should the DSC curve have multiple inflection points, then the midpoint of at least one of the inflection points is above that value.

For the purposes of this invention, compressive strength at or before 10% deflection is measured according to ASTM D-1621-04a. By "deflection," we mean the distance that the compression platens move in the compressive testing machine described in ASTM D-1621-04a. By "maximum compressive strength at or before 10% deflection" we mean the highest compressive strength that is measured according to ASTM D-1621-04a before the platens deflect no more than 10%.

"(Meth)acrylate" means acrylate or methacrylate, and "(meth)acrylic" means acrylic or methacrylic.

When we refer to "multifunctional acrylates" we are referring to compounds that include two or more residues of (meth)acrylic acid attached to the compound with an ester or amide linkage. Multifunctional (meth)acrylates with at least two double bonds capable of acting as an acceptor in Michael addition are suitable in this invention. Preferred poly-functional (meth)acrylates are poly-functional acrylates (compounds with two or more residues of acrylic acid, attached with an ester or amide linkage).

Examples of suitable multi-functional acrylates include 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, trimethylolpropane triacrylate, ethoxylated trimethylolpropane triacrylate, propoxylated trimethylolpropane triacrylate, acrylated polyester oligomer, bisphenol A diacrylate, acrylated bisphenol A diglycidylether, ethoxylated bisphenol A diacrylate, tris(2-hydroxyethyl)isocyanurate triacrylate, acrylated aliphatic urethane oligomer, acrylated aromatic urethane oligomer, and the like, and mixtures thereof.

Also suitable as the multi-functional (meth)acrylates in which the (meth)acrylate groups are attached to polymeric skeletons. The (meth)acrylate groups may be attached to the polymeric skeleton in any of a wide variety of ways. For example, a (meth)acrylate ester monomer may be attached to a compound containing a polymerizable functional group through the ester linkage, and that polymerizable functional group containing compound may be polymerized with other monomers in a way that leaves the double bond of the (meth)acrylate group intact. For another example, a polymer may be made with functional groups (such as, for example, a polyester with residual hydroxyls), which may be reacted with a (meth)acrylate ester (for example, by transesterification), to yield a polymer with pendant (meth)acrylate groups. For yet another example, a homopolymer or copolymer may be made that includes a poly-functional acrylate monomer (such as trimethylol propane triacrylate) in such a way that not all the acrylate groups react. In embodiments in which the skeleton of the multi-functional Michael acceptor is a polymer, the functional groups may be pendent from the polymer chain, or they may be incorporated into the polymer chain, or a combination thereof.

The most preferred multifunctional acrylate is selected from one or more of the group of trimethylolpropanetriacrylate, pentaerythritoltetraacrylate di-trimethylolpropanetertraacrylate, di-pentaerythritolhexaacrylate, di-pentaerthritolpentaacrylate, diacrylate of diglycidyl ether bisphenol-A, ethoxylated trimethylolpropane triacrylate, tricyclodecanedimethanol diacrylate, and cyclohexanedimethanol diacrylate.

Suitable multifunctional acetoacetates and cyanoacetates include acetoacetate esters and cyanoacetate esters of alcohols such as methanol, ethanol, tertiary butanol and 2-hydroxyethyl (meth)acrylate. Also suitable are the acetoacetate esters and cyanoacetate esters of polyhydric alcohols such as 1,4-butanediol, 1,6-hexanediol, neopentyl glycol, 4,8-Bis(hydroxymethyl)tricyclo[5.2.1.0.sup.2,6]decane, 2-methyl-1,3-propanediol, propylene glycol, diethylene glycol, ethylene glycol, dipropylene glycol, polyethylene glycol, polypropylene glycol, cyclohexanedimethanol, trimethylol propane, pentaerythritol triacetoacetate, glycerol, trimethylolethane, di-pentaerythritol, di-trimethylol propane, glucose, isosorbide, butyl ethyl propanediol.

Further suitable multifunctional acetoacetates and cyanoacetates acetoacetate esters and cyanoacetate esters derived from polyester polyols or polyesteramide polyols.

Acetoacetate-functional polyester polymers or cyanoacetate-functional polyesters may be made by any available method; one method, for example, is a two step process. In the first step, one or more polyhydric alcohols such as a diol or triol are condensed with one or more di- or tricarboxylic acids to form a polyester terminated with hydroxy groups. In the second step, the polyester is reacted with an acetoacetate or cyanoacetate compound such as, for example, an alkyl acetoacetate with an alkyl group with 1 to 4 carbon atoms. Similarly, acetoacetate-functional or cyanoacetate-functional polyesteramide polymers may be made by any available method; one method, for example, is a two step process. In the first step, one or more polyhydric alcohol such as a diol or triol, including at least one amino alcohol, is condensed with one or more di- or tricarboxylic acids to form a polyesteramide terminated with hydroxy groups. In the second step, the polyesteramide is reacted with an acetoacetate compound such as, for example, an alkyl acetoacetate with an alkyl group with 1 to 4 carbon atoms.

Suitable bases for use in creating the reaction product of the invention include those described in U.S. Patent Publication No. 20050081994 (Beckley et al.) and US20050245721 (Beckley et al.) that are incorporated herein by reference. In fact, any base that can trigger the reaction described above is suitable. Preferred based are those base is selected from the group consisting of N,N,N',N'-tetramethylguanidine, 1,8-diazabicyclo[5.4.0]undec-7-ene, 1,5-diazabicyclo[4.3.0]non-5-ene, tetramethylammonium hydroxide, (2-hydroxyethyl)trimethylammonium hydroxide, potassium carbonate, potassium phosphate, potassium phenoxide, sodium phenoxide, and tetraethylammonium hydroxide.

As indicated previously, foams made according to this invention utilize a blowing agent, preferably one that has at least one component that has a boiling point below about 50° C. Suitable blowing agents include pentanes, fluorinated hydrocarbons, chlorofluorinated hydrocarbons, formate esters and carbon dioxide. Preferable blowing agents include one or more selected from cyclopentane, n-pentane, formaldehyde dimethylacetal, methylformate, methyl butane, 1,1,2,2,3-pentafluoropropane, 1,1,1,3,3-pentafluoropropane, 1,1,1,3,3-pentafluorobutane, 1,1,1,2,3,4,4,5,5,5-decafluoropentane carbon dioxide and perfluoropentane.

Most preferred blowing agents are cyclopentane, n-pentane, formaldehyde dimethylacetal, methylformate, methyl butane, 1,1,2,2,3-pentafluoropropane, 1,1,1,3,3-pentafluoropropane, 1,1,1,3,3-pentafluorobutane, and 1,1,1,2,3,4,4,5,5,5-decafluoropentane.

The examples that follow illustrate certain foams consistent with this invention and several comparative examples.

EXAMPLE 1

Comparative Example With Acrylate Over Acetoacetate Ratio of 1.0

A polyethylene container (±150 ml cylindrical with an internal diameter of ±6.5 cm) was charged with 36.0 grams of Morcure™ 2000 (see below for a description of this product) and 24.0 grams of di-trimethylolpropane tetra-acrylate. This mixture was stirred with an overhead stirrer at 500 rpm using a 4-bladed, 45° pitch turbine impeller with a diameter of 4.8 cm. After the mixture was homogenized a premix of 44.8 grams of trimethylolpropane tri-acetoacetate, 1.0 grams of Tegostab™ B-8469 and 8.4 grams of cyclopentane was added to this mixture. The agitation speed was then increased to 1500 rpm and after 15 to 30 seconds 2.0 grams of N,N,N',N'-tetramethylguanidine was added. The mixture was allowed to stir for 15 seconds then the mixture was poured into a polyethylene container (11.5 cm by 15.0 cm by 5.5 cm) and allowed to react without further agitation. Within a couple of minutes after the addition of the N,N,N',N'-tetramethylguanidine a foam formed. When the foam cooled down, the volume of the foam shrunk to less than 75 volume percent of its maximum volume.

EXAMPLE 2

Comparative Example With Acrylate Over Acetoacetate Ratio of 1.2

The same procedure was followed as for example 1. The weights used are listed in table 1. This foam also shrunk to less than 75 volume percent of its maximum volume during cooling.

EXAMPLES 3-5

Examples According to the Invention With Acrylate Over Acetoacetate Ratios of 1.4 and Higher The same procedure was used as for example 1. The weights used are listed in Table 1. These foams shrunk less than 5 volume percent during cooling. Table 2 lists the main characteristics of these foams.

TABLE 1

Compositions of examples 1 to 5.

| | Example | | | | |
|---|---|---|---|---|---|
| | 1 | 2 | 3 | 4 | 5 |
| acrylate/acetoacetate (mol/mol) | 1.0 | 1.2 | 1.4 | 1.6 | 1.8 |
| Morcure ™ 2000[4] | 36 | 36 | 36 | 36 | 36 |
| Di-TMPTA[1] | 24 | 24 | 24 | 24 | 24 |
| TMPtrisAcAc[2] | 44.8 | 37.3 | 32.0 | 28.0 | 24.9 |
| Tegostab ™ B-8469 | 1.0 | 1.0 | 0.9 | 0.9 | 0.8 |
| cyclopentane | 8.4 | 7.8 | 7.4 | 7.0 | 6.8 |
| TMG[3] | 2.0 | 1.7 | 1.4 | 1.3 | 1.1 |

[1]di-trimethylolpropane tetra-acrylate,
[2]trimethylolpropane tri-acetoacetate
[3]N,N,N',N'-tetramethylguanidine
[4]diacrylate of diglycidyl ether bisphenol-A, from Rohm and Haas Co., Philadelphia, PA

TABLE 2

Properties of foams from examples 1 to 5

| | Example | | | | |
|---|---|---|---|---|---|
| | 1 | 2 | 3 | 4 | 5 |
| acrylate/acetoacetate (mol/mol) | 1.0 | 1.2 | 1.4 | 1.6 | 1.8 |
| density (kg/m$^3$) | nd* | nd | 45 | 44 | 47 |
| Tg (DSC, ° C.) | 35 | | 70 | 80 | 87 |
| compressive strength (kPa) at or before 10% deflection | nd | nd | 66.9 | 128 | 150 |

*not determined due to excessive shrinking of the foam.

EXAMPLE 6

Preparation of a Multifunctional Cyanaoacetate

A three-neck 1 liter glass reactor equipped with an electrical stirrer, a gas inlet tube, a Dean-Stark trap with reflux cooler and a digital thermometer was charged with 63.6 grams (0.474 moles) trimethylol propane, 176.9 grams (1.564 moles) ethyl cyanoacetate and 0.3 grams butyltin hydroxide oxide hydrate. Under a nitrogen blanket the reactor was heated to 150° C. This temperature was maintained for 6 hours. During the first 3 hours 32.7 grams ethanol was removed from the reactor. During the last 3 hours 117 grams of toluene was fed into the reactor at a constant rate. All reflux collected during the last 3 hours in the Dean-Stark trap was removed from the reactor. Once the toluene feed was completed the remaining volatiles were removed from the reactor by vacuum. Final yield of product was 152.1 grams which on a weight bases corresponded to a 74% conversion of hydroxyl groups into cyanoacetate groups. Carbon-13 NMR analysis showed 77% conversion of hydroxyl groups into cyanoacetate groups.

EXAMPLE 7

Example According to the Invention With an Acrylate Over Acetoacetate Ratio of 1.8

A polyethylene container (±150 ml cylindrical with an internal diameter of ±6.5 cm) was charged with 36.7 grams of Morcure™ 2000 and 24.5 grams of di-trimethylolpropane tetra-acrylate. This mixture was stirred with an overhead stirrer at 500 rpm using a 4-bladed, 45° pitch turbine impeller with a diameter of 4.8 cm. After the mixture was homogenized a premix of 28.5 grams of the cyanoacetate prepared in example 6, 0.9 grams of Tegostab™ B-8469 and 9.0 grams of cyclopentane was added to this mixture. The agitation speed was then increased to 1500 rpm and after 15 to 30 seconds 0.04 grams of N,N,N',N'-tetramethylguanidine was added. The mixture was allowed to stir for 15 seconds then the mixture was poured into a polyethylene container (11.5 cm by 15.0 cm by 5.5 cm) and allowed to react without further agitation. Within a couple of minutes after the addition of the N,N,N',N'-tetramethylguanidine, a foam formed. The final foam had a Tg of 93° C. and a compressive strength of 109 kPa.

EXAMPLE 8

Preparation of an Acetoacetamide-Containing Foam

This example describes the preparation of a foam based on an acetoacetamide starting material. The foam can be prepared in the following manner. A polyethylene container (±150 ml cylindrical with an internal diameter of ±6.5 cm) will be charged with 45.0 grams of Morcure™ 2000 and 15.0 grams of di-trimethylolpropane tetra-acrylate. This mixture will be stirred with an overhead stirrer at 500 rpm using a 4-bladed, 45° pitch turbine impeller with a diameter of 4.8 cm. After homogenizing the mixture, a premix of 17.8 grams of 3-oxo-butyric acid 2-(3-oxo-butyrylamino)-ethyl ester, 0.8 grams of Dabco™ DC193, and 4.7 grams of n-pentane will be added to this mixture. The agitation speed will be increased to 1500 rpm and after 15 to 30 seconds 0.9 grams of N,N,N',N'-tetramethylguanidine will be added. After allowing the mixture to stir for 15 seconds, the mixture will be poured into a polyethylene container (11.5 cm by 15.0 cm by 5.5 cm) and allowed to react and form a foam without further agitation.

Density was determined according to ASTM D1622-03, by measuring the foam block volume (length, width and height) as well as the mass after conditioning the block for more than 24 hours at 23° C./50% relative humidity.

Foams made according to this invention can be spray applied on various substrates, and will set in place and expand to low-density rigid foams. Such substrates include exterior and interior surfaces of buildings and homes to provide insulation. The foams can be injected into cracks and building cavities and the like.

These foam formulations can also be used to make low density rigid foam slab or sheet stock in a factory, which foam materials can be then fastened or adhered to various substrates such as those described above

We claim:

1. A foam comprising the reaction product of (a) one or more multifunctional acrylate compounds with (b) one or more multifunctional acetoacetate compounds in the presence of a base and a blowing agent wherein the molar ratio of acrylate groups in (a) to the acetoacetate groups in (b) is greater than 1.4, wherein the measured Tg of the reaction product is greater than about 50° C., and wherein the foam has a density of less than 80 kilograms per cubic meter, has a maximum compressive strength greater than 35 kilopascal at or before 10% deflection of the foam.

2. The foam of claim 1 that has a rise time of less than 600 seconds to its maximum volume following initiation of the reaction, and shrinks less than 25 volume percent after the maximum volume is achieved.

3. The foam of claim 1 wherein said ratio is between 1.5 and 2.0.

4. The foam of claim 3 wherein at least one component of the blowing agent has a boiling point less than 50° C.

5. The foam of claim 4 wherein the measured Tg of the reaction product is greater than about 80° C.

6. The foam of claim 5 having a density between 25 and 60 kilograms per cubic meter.

7. The foam of claim 1 where the base is selected from the group consisting of tetramethylguanidine, 1,8-diazabicyclo [5.4.0]undec-7-ene, 1,5-diazabicyclo[4.3.0]non-5-ene, tetramethylammonium hydroxide, (2-hydroxyethyl)trimethylammonium hydroxide, potassium carbonate, potassium phosphate, potassium phenoxide, sodium phenoxide, tertraethylammonium hydroxide.

8. The foam of claim 1 wherein the acetoacetate compound is selected from one or more of the group of acetoacetates derived from glycerol, trimethylolpropane, ethanol isosorbide, neopentylglycol, pentaerythritol, di-methylolpropane, -pentaerythritol, di-pentaerythritol, propoxylated monosaccharides and trimethylol ethane.

9. The foam of claim 1 wherein the multifunctional acrylate is selected from one or more of the group of trimethyloipropanetriacrylate, pentaerythritoltetraacrylate di-trimethylolpropanetertraacrylate, di-pentaerythritolhexaacrylate, di-pentaerthritolpentaacrylate, diacrylate of diglycidyl ether bisphenol-A, ethoxylated trimethylolpropane triacrylate, tricyclodecanedimethanol diacrylate, and cyclohexanedimethanol diacrylate.

10. The foam of claim 4 wherein the blowing agent is selected from the group of cyclopentane, n-pentane, formaldehyde dimethylacetal, methylformate, methyl butane, 1,1,2,2,3-pentafluoropropane, 1,1,1,3,3-pentafluoropropane, 1,1,1,3,3-pentafluorobutane, 1,1,1,2,3,4,4,5,5,5-decafluoropentane.

* * * * *